(12) United States Patent
Oksman

(10) Patent No.: US 7,929,471 B2
(45) Date of Patent: Apr. 19, 2011

(54) DATA PACKET ENCAPSULATION PROTOCOL

(75) Inventor: Vladimir Oksman, Morganville, NJ (US)

(73) Assignee: Lantiq Deutschland GmbH, Neubiberg (DE)

( * ) Notice: Subject to any disclaimer, the term of this patent is extended or adjusted under 35 U.S.C. 154(b) by 1976 days.

(21) Appl. No.: 10/945,200

(22) Filed: Sep. 20, 2004

(65) Prior Publication Data

US 2006/0062244 A1    Mar. 23, 2006

(51) Int. Cl.
*H04L 5/22* (2006.01)
(52) U.S. Cl. .................. 370/300; 370/470; 370/506
(58) Field of Classification Search ............ 370/474, 370/465, 503, 506, 473
See application file for complete search history.

(56) References Cited

U.S. PATENT DOCUMENTS

| | | | |
|---|---|---|---|
| 5,428,611 A | 6/1995 | Jain et al. | |
| 5,625,629 A * | 4/1997 | Wenk | 370/347 |
| 6,112,245 A | 8/2000 | Araujo et al. | |
| 6,996,095 B2 * | 2/2006 | McNeil et al. | 370/358 |
| 2002/0042836 A1 | 4/2002 | Mallory | |
| 2002/0136231 A1 | 9/2002 | Leatherbury et al. | |
| 2003/0095054 A1 | 5/2003 | Ichino | |
| 2003/0193945 A1 | 10/2003 | Lewin et al. | |
| 2004/0120319 A1 * | 6/2004 | Asawa et al. | 370/395.4 |
| 2005/0018670 A1 * | 1/2005 | Shigematsu et al. | 370/389 |

FOREIGN PATENT DOCUMENTS

WO    WO 03/017603 A1    2/2003

OTHER PUBLICATIONS

Cosco, Broadcom, Ericsson "Modified 64/65B encapsulation to support preemption", Temporary Document LB-036, Leuven, Belgium, Jun. 2004, 7 pgs.
Cosco, Broadcom, Ericsson Modified 64/65B encapsulation to support pre-emption and short frames, Temporary Document LC-094R1 Lake Tahoe California, Aug. 2004, 4 pgs.
International Search Report, Int'l Application No. PCT/EP2005/010001, Int'l Filing Date Sep. 16, 2005, 3 pgs.

* cited by examiner

*Primary Examiner* — Seema S Rao
*Assistant Examiner* — Henry Baron
(74) *Attorney, Agent, or Firm* — Eschweisler & Associates, LLC

(57) ABSTRACT

Protocols or methods are presented for encapsulating data in frames for transmission in a communication system, wherein (N+M)-byte frames are provided having one or a few sync bytes indicating a frame boundary, as well as an N-byte frame data field following the sync byte. Data bytes from packets are provided in the data field, wherein the data packets can be any length, including packets shorter than N−1 data bytes long.

16 Claims, 8 Drawing Sheets

| | Frame Type | Frame Contents | Sync Byte | Data Field, bytes 1-64 in byte fields $P_0$-$P_{63}$ | | | | | | | | | | |
|---|---|---|---|---|---|---|---|---|---|---|---|---|---|---|
| | | | | $P_0$ | $P_1$ | $P_2$ | ... | $P_{k-1}$ | $P_k$ | $P_{k+1}$ | ... | $P_n$ | ... | $P_{61}$ | $P_{62}$ | $P_{63}$ |
| R1 | Data only | Data bytes (D) only | $0F_H$ | $D_0$ | $D_1$ | $D_2$ | ... | $D_{k-1}$ | $D_k$ | $D_{k+1}$ | ... | ... | ... | $D_{61}$ | $D_{62}$ | $D_{63}$ |
| R2 | End of packet | Control byte ($C_k$) followed by k bytes of data, others are idle (Z) | $F0_H$ | $C_k$ | $D_0$ | $D_1$ | ... | $D_{k-1}$ | Z | Z | ... | ... | ... | Z | Z | Z |
| R3 | End of packet and Start of next packet | Control byte ($C_k$) followed by k bytes of data, final j bytes are data from the next frame. S-byte indicates start of next packet | $F0_H$ | $C_k$ | $D_0$ | ... | ... | ... | S | $D_0$ | ... | $D_0$ | ... | $D_{j-3}$ | $D_{j-2}$ | $D_{j-1}$ |
| R4 | Idle | Idle bytes (Z) only | $F0_H$ | Z | Z | Z | Z | Z | Z | Z | Z | Z | Z | Z | Z | Z |
| R5 | Start of packet while idle | First k bytes are idle (Z), last j=64-k-1 bytes are data. S byte indicates start of the packet | $F0_H$ | Z | Z | Z | ... | S | $D_0$ | ... | ... | ... | ... | $D_{j-3}$ | $D_{j-2}$ | $D_{j-1}$ |
| R6 | Idle, no sync | Idle bytes (Z) only | | Y | Z | Z | Z | Z | Z | Z | Z | Z | Z | Z | Z | Z |
| R7 | End of packet and Multiple short packets | (1) Control byte ($C_k$) followed by k bytes of data. (2) Control byte(s) ($C_i$) followed by Z-bytes, S-byte, and a packet which ends at byte $D_{q-1}$, j bytes altogether. (3) Last bytes may be all Z or another combination of $C_{j1}$, Z-bytes, S-byte, and the next packet. (4) If this packet ends in a subsequent frame, $C_{j1}$ = Z (or S). | $F0_H$ | $C_k$ | $D_0$ | ... | ... | ... | $D_{k-1}$ | $C_i$ | ... | ... | S | $D_0$ | ... | $D_{q-1}$ | Z |
| R8 | Short packet or Multiple short packets | (1) Control byte ($C_i$) followed by Z-bytes, S-byte, and a packet which ends at byte $D_{q-1}$, i bytes altogether. (2) Last bytes may be all Z or another combination of $C_{j1}$, Z-bytes, S-byte, and the next packet. (3) If this packet ends in one a subsequent frame, $C_{j1}$ = Z (or S). | $F0_H$ | $C_i$ | Z | ... | S | $D_0$ | $D_{k-1}$ | $C_{j1}$ | ... | $D_0$ | S | ... | $D_{q-1}$ | Z |

FIG. 1

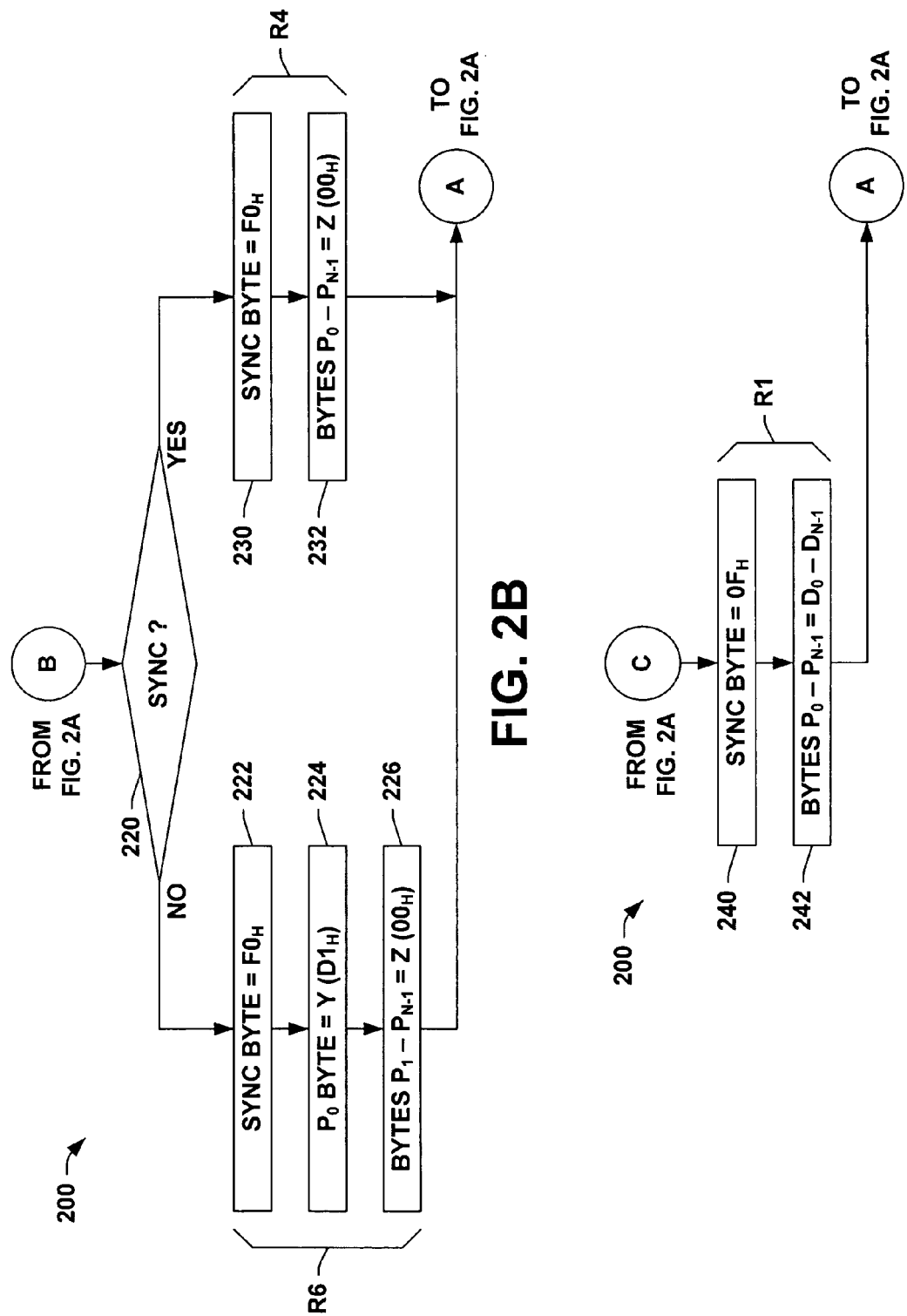

| | Frame Type | Frame Contents | Sync Byte | Data Field, bytes 1-64 in byte fields $P_0$-$P_{63}$ | | | | | | | | | | |
|---|---|---|---|---|---|---|---|---|---|---|---|---|---|---|
| | | | | $P_0$ | $P_1$ | $P_2$ | --- | $P_{k-1}$ | $P_k$ | $P_{k+1}$ | --- | --- | $P_{61}$ | $P_{62}$ | $P_{63}$ |
| R1 | Data only | Data bytes (D) only | $0F_H$ | $D_0$ | $D_1$ | $D_2$ | --- | $D_{k-1}$ | $D_k$ | --- | --- | --- | $D_{61}$ | $D_{62}$ | $D_{63}$ |
| R2 | End of packet | Control byte ($C_k$) followed by k bytes of data, others are idle (Z) | $F0_H$ | $C_k$ | $D_0$ | $D_1$ | --- | | $D_{k-1}$ | Z | --- | --- | Z | Z | Z |
| R3 | End of packet and Start of next packet | Control byte ($C_k$) followed by k bytes of data, final j bytes are data from the next frame. S-byte indicates start of next packet | $F0_H$ | $C_k$ | $D_0$ | | --- | | $D_{k-1}$ | Z | --- | S | $D_{j-3}$ | $D_{j-2}$ | $D_{j-1}$ |
| R4 | Idle | Idle bytes (Z) only | $F0_H$ | Z | Z | Z | --- | Z | --- | --- | --- | --- | Z | Z | Z |
| R5 | Start of packet while idle | First k bytes are idle (Z), last j=64-k-1 bytes are data. S byte indicates start of the packet | $F0_H$ | Z | Z | Z | --- | Z | S | $D_0$ | --- | --- | $D_{j-3}$ | $D_{j-2}$ | $D_{j-1}$ |
| R6 | Idle, no sync | Idle bytes (Z) only | $F0_H$ | Y | Z | Z | --- | Z | Z | Z | --- | Z | Z | Z | Z |

FIG. 3
(PRIOR ART)

DATA PACKET ENCAPSULATION PROTOCOL

FIELD OF INVENTION

The present invention relates generally to communication systems and more particularly to data packet encapsulation methods for DSL and other communication systems.

BACKGROUND OF THE INVENTION

Digital communication systems provide for exchange of data between devices, where the bits of data are typically transferred over a communication medium in groups (packets). For example, in telecommunications or other networked systems, packets of data are transmitted from a source device to a destination device, where the network communication protocol may call for segmentation of a data packet into a number of chunks or frames that are separately transferred to provide services such as internet browsing, voice over IP, digital video, Ethernet, etc. Networks are typically implemented as a series of layers in a model, for example, the Open Systems Interconnection (OSI) model, in which a first (lowest) layer is the physical layer at which electrical signals are actually transferred. The second OSI layer is known as the data link layer that is between the physical layer and a network layer. The main function of the data link layer (layer 2) is to make the physical layer appear to the network layer (layer 3) as a transmission line that is free of transmission errors. In the data link layer, the input data packet is segmented into data frames that are then provided to the physical layer in sequence for transmission to the destination device, where the data link layer may also process acknowledgment frames sent back by the receiver.

In most systems, a unit of data being transferred to a destination device is provided from an upper interconnection layer, such as the network layer, to the data link layer, which then forms one or more frames that encapsulate the data packet according to an encapsulation or framing protocol or procedure. The physical layer accepts and transmits a stream of bits regardless of meaning or structure, whereas the data link layer creates or defines frame boundaries, sometimes by using special bit patterns appended to the beginning and/or end of the transmitted frame. In this context, an encapsulation or framing protocol is a group of rules for transferring a data packet across a communication medium to a destination device that verifies whether the data has been successfully received, wherein the protocol is needed to ensure that the destination device can recognize the boundaries of the transmitted packet to identify and decode its contents thereof. In general, it is desirable to maximize data throughput by minimizing the amount of overhead or identification (alignment) bytes that are added to the packet in creating a frame for transmission. Currently, there are many protocols used for transporting packets, including the International Telecommunication Union (ITU-T) standardized General Framing Procedure (GFP), which allows transfer of any type of packet over any media. The GFP protocol, however, suffers from relatively high overhead (e.g., at least six overhead bytes per packet), as well as rather complex synchronization.

Another popular protocol is known as High-level Data Link Control (HDLC, ISO/IEC 3309), which was standardized by the ITU-T for packetized data transport in Very High Digital Subscriber Line (VDSL) and Asynchronous Digital Subscriber Line (ADSL) communications. Digital subscriber line (DSL) technology provides high-speed data transfer between two modems across ordinary telephone lines, wherein digital data transfer rates from tens of Kbps to tens of Mbps are supported over standard (e.g., twisted pair) telephone lines, while still providing for plain old telephone service (POTS). Asynchronous Digital Subscriber Line (ADSL) and VDSL have emerged as popular implementations of DSL systems, where ADSL is defined by American National Standard Institute (ANSI) standard T1.413 and International Telecommunication Union (ITU-T) standards G.992.3, G.992.5, and VDSL is defined by ANSI standard T1.424 and ITU-T standards G.993.1. HDLC is a data link layer encapsulation protocol that allows transport of any type of data packet. However, due to the specific byte-stuffing mechanism introduced to avoid false detection of HDLC frames, the amount of overhead introduced for transmission using HDLC depends on the packet data contents. Because the overhead is variable, however, HDLC was found inappropriate for Ethernet data transport.

More recently, the Institute of Electrical and Electronics Engineers (IEEE) has proposed a new protocol for Ethernet transport over DSL, using 64/65-byte encapsulation, also known as 64B/65B, which has low, stable overhead (1 overhead sync byte per 65 byte frame), where the overhead is largely independent of the packet size and contents. However, the use of the 64B/65B protocol imposes limitations on the minimum size of packets to be transmitted, and thus inhibits adoption of this protocol in situations where a universal protocol is desired for multiple types of services beyond Ethernet. In this regard, it is desirable to provide a universal framing protocol for DSL and other communication systems, which provides support for Ethernet as well as other protocols, such as IP, for instance. Accordingly, there is a need for improved communication data packet encapsulation methods and protocols for use in transferring data in a DSL or other communication system. Also, since Ethernet is currently one of the most widely used protocols, it is desirable that new encapsulation methods will be based on the same principal as the standard IEEE 64B/65B encapsulation to simplify implementations intended to operate universally.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

The present invention involves encapsulation protocols or methods for framing packet data for transmission in a communication system, in which low overhead frames are provided with one or a small number M of sync bytes to delineate frame boundaries, along with an N byte data field, wherein the methods provide for encapsulation or framing of short data packets having less than N data bytes as well as longer packets. The invention may be employed to facilitate the use of low overhead frames for different data packet types, for example, to support N/(N+M)-byte frames (e.g., 64B/65B frames, if N=64 bytes and M=1 byte) for both Ethernet type packets that are larger than or equal to 64 bytes long, as well as for shorter packets that may be useful for delay-sensitive data services such as voice over IP, etc.

In one aspect of the invention, a method is provided for encapsulating data to form a frame in a communication system, where the method comprises forming an integer number M sync bytes indicative of a frame boundary, wherein M is a positive integer, forming a frame data field consisting of an integer number N byte fields following the M sync bytes to form a frame consisting of N+M bytes. The method further comprises providing data bytes of a short data packet in the data field, where the short data packet has a length that is less than N−1 data bytes. The transmit packet of data, with the minimum length of 1 byte and not limited by its maximum length is thus mapped over the frame data field. Other aspects of the invention provide methods for encapsulating data to form (N+M)-byte frames for transmission in a communication system. The methods comprise providing a single sync byte or a small number M synch bytes, and an N byte frame data field following the sync byte to create an (N+M)-byte frame (N being a positive integer greater than 1), wherein the sync byte is indicative of a start of the frame, as well as providing a short data packet in the data field, where the short data packet has a length that is less than N−1 data bytes.

The following description and annexed drawings set forth in detail certain illustrative aspects and implementations of the invention. These are indicative of only a few of the various ways in which the principles of the invention may be employed.

BRIEF DESCRIPTION OF THE DRAWINGS

FIG. 1 is a table illustrating an exemplary data framing or encapsulation protocol and rules thereof in accordance with one or more aspects of the present invention;

FIGS. 2A-2G provide a flow diagram illustrating an exemplary method of encapsulating data packets according to the present invention; and FIG. 3 is a table illustrating a conventional 64B/65B data encapsulation protocol.

DETAILED DESCRIPTION OF THE INVENTION

Figure 2A:
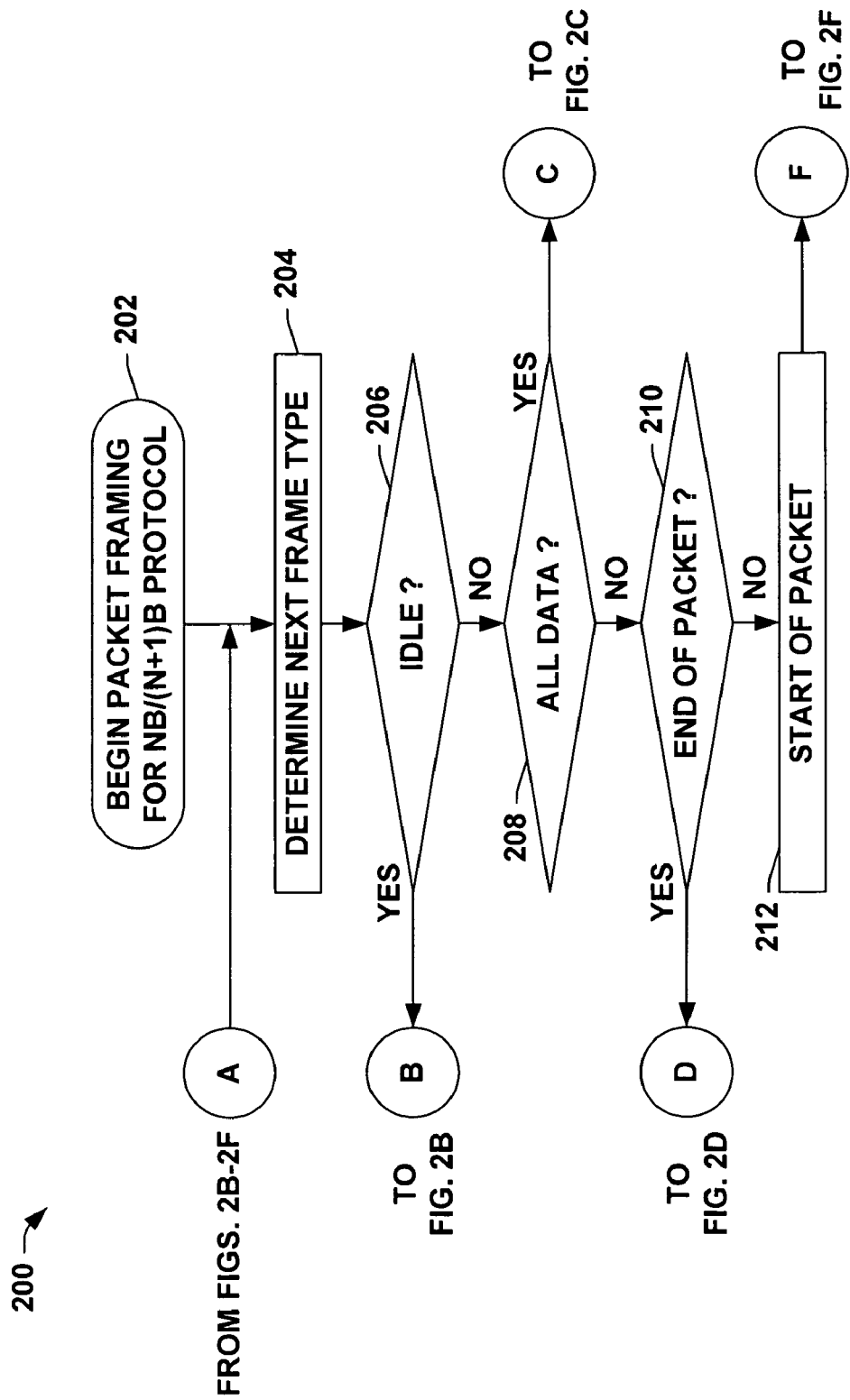

One or more implementations of the present invention will now be described with reference to the attached drawings, wherein like reference numerals are used to refer to like elements throughout. The invention relates to encapsulation or framing methods or protocols for encapsulating packet data bytes or octets using (N+M) byte frames with one or a few (M) sync bytes, where the data packets encapsulated for transmission can be of any length, specifically they can be less than N−1 bytes long. In the following examples, the various aspects of the invention are illustrated and described in the context of modifications to the conventional 64B/65B framing protocol. However, the invention may be implemented in association with any such low overhead frames, such as NB/(N+M)B frames (e.g. N/(N+M)-byte frame) having an integer number M sync bytes and a data field having an integer number N data byte fields, wherein all such implementations are contemplated as falling within the scope of the invention and the appended claims.

Referring initially to FIG. 3, a conventional IEEE 64B/65B framing protocol 10 is illustrated in table form, where the protocol 10 includes six basic rules R1-R6 in corresponding table rows, generally in accordance with the IEEE standard IEEE.802.3ah. The protocol 10 of FIG. 3 defines a new standard for Ethernet service for data transport over DSL physical layers, wherein the rules R1-R6 may be used to encapsulate Ethernet packets over a DSL channel using 65 bytes of coded data (e.g., a 65 byte frame) to transport up to 64 bytes of packet data, referred to as 64B/65B encapsulation or 64/65 octet encapsulation. The Ethernet standard defines the transport of packets over a single channel of a physical layer link, wherein Ethernet packets can carry between 46 and 1500 data bytes, together with 18 bytes of overhead information, including a 6-byte destination address, a 6-byte source address, a 2-byte length/type field, and a 4-byte FCS/CRC field, whereby Ethernet packets vary in size from 64 bytes to 1518 bytes. Accordingly, the encapsulation protocol 10 of FIG. 3 and the rules R1-R6 thereof provide for framing Ethernet packets that are 64 or more bytes using 65 byte frames, where a single sync byte ($0F_H$ or $F0_H$) is provided to indicate the start of each frame, followed by 64 data byte fields in byte positions $P_0$-$P_{63}$, where the subscripts "H" herein indicate hexadecimal values.

Rule R1 in the protocol 10 provides for situations where the entire frame data field is data bytes (e.g., where the start and the end of the transmit packets are both beyond the frame). In this situation, the sync byte has a value of $0F_H$ (00001111 binary), where data bytes $D_0$-$D_{63}$ are provided in the subsequent byte fields at positions $P_0$-$P_{63}$. When no new data packets are ready for encapsulation or framing, the protocol 10 provides for idle frames to be sent according to rules R4 and R6 (R6 is used to indicate that transmission is not synchronized). In both cases, the sync byte has a value of $F0_H$, wherein all the byte fields at positions $P_0$-$P_{63}$ are "Z" in the first case of rule R4, where Z-bytes are idle bytes having a value of $00_H$ (00000000 binary). In the case of non-synchronized idle frames in rule R6, the first byte field at position $P_0$ is a "Y" byte having a value of $D1_H$ (11010001 binary), with the remaining bytes in the frame data field being Z-bytes ($00_H$).

Rules R2 and R3 cover situations in which a previously started packet is completed (e.g., ends) in the current frame, wherein the sync byte has a value of $F0_H$. In accordance with rule R2, a control byte $C_k$ is provided following the sync byte, and the remainder of the data bytes from the previously started packet $D_0$-$D_{k-1}$ are provided in the subsequent byte fields at positions $P_1$-$P_k$ following the control byte $C_k$ which indicates the position $P_k$ at which the packet data ends. The control byte $C_k$ has a value that depends on the number of bytes k being sent from the finished packet in the frame, where k can be 0-63. The control byte value $C_k$ is computed as $k+10_H$ (e.g., k+00010000 binary), where the most significant bit (MSB) of $C_k$ is set such that the resulting value of $C_k$ has even parity (e.g., $C_0=90_H$, $C_1=11_H$, $C_2=12_H$, $C_3=93_H$, . . . $C_{62}=4E_H$, and $C_{63}=CF_H$). In this manner, the control byte $C_k$ indicates the position $P_k$ of the final data byte $D_{k-1}$ of the packet in the frame data field. After the last data byte $D_{k-1}$, the remaining bytes in the frame data field are Z-bytes ($00_H$).

Rule R3 provides for starting the next data packet after the current packet ends in a frame. As in rule R2, a control byte $C_k$ is provided following the sync byte to indicate the position $P_k$ of the final data byte $D_{k-1}$ of the packet that is being completed, where $C_k$ is computed as described above depending on the number of remaining bytes k in the ending packet. Thereafter, zero, one, or more Z-bytes ($00_H$) may be provided following the last data byte $D_{k-1}$, and a start byte S is provided before the initial j data bytes of the next packet $D_0$-$D_{j-1}$. The start byte S has a value of $50_H$ (01010000 binary) and indicates to the receiving device that the data starts in the next byte field (e.g., indicates the beginning of the next packet within the current frame). The 64B/65B protocol further allows cases in which only a start byte S is included in a frame (rules R3 and R5), where the start byte S may be located at the end of the frame, and where the first data byte of the next packet starts in the next frame. It is noted that since the Ethernet packets are limited to sizes of 63 bytes or more, the packet that is ending in rule R3 was started in a previous frame, and the packet that is started in rule R3 is completed in a subsequent frame, wherein the delimiters $C_k$ and S are used to indicate the packet end and start positions, respectively, such that a device receiving the frame can ascertain where the data is and thus differentiate between the two packets. Rule R5 illustrates the case where a packet is started within a frame after zero, one or more Z-bytes, wherein a start byte S is provided prior to the first data byte $D_0$ as in rule R3 above.

As can be seen in FIG. 3, the 64B/65B protocol 10 has low, stable overhead (e.g., only 1 overhead sync byte per 65 byte frame), where the overhead is independent of the packet size and contents. However, the conventional protocol 10 is limited to use with Ethernet or other packet types having lengths of 63 bytes or more. Accordingly, while the conventional 64B/65B encapsulation 10 provides for generally low overhead, it cannot be used for transport of short packets of less than 63 bytes, unless short packets are artificially delayed to be placed over the boundary line between two subsequent frames. This clearly reduces efficiency of the protocol and leads to additional delays, which may not be appropriate, for example, to provide for delay sensitive transmission of short packets for voice over IP or other services. In DSL and other types of communication systems, it is desirable to provide low, stable overhead while transferring data of different packet sizes, wherein the minimum packet size constraints of the conventional 64B/65B protocol 10 limit its applicability in such situations.

Referring now to FIG. 1, the present invention provides methods and protocols for data encapsulation which can be employed in framing data packets that are shorter than the number of byte fields in the frame, while allowing the benefits of the above 64/65-byte and other N/(N+1)-byte frames, including low overhead and compatibility with Ethernet packets and other larger packets. In this regard, although illustrated and described in FIG. 1 in the context of 65-byte frames having a single sync byte at the beginning of each frame, the present invention may be employed with frames of other lengths, wherein a single or a small integer number M sync bytes (or other frame boundary indicating bytes) are used to delineate frame boundaries, for example, such as N/(N+M)-byte frames having a length of (N+M) bytes, for example, where M is 1 or 2, and N is a positive integer greater than M. Specifically, the benefit of using higher values of N is smaller overhead (however frame delineation is less robust).

FIG. 1 illustrates an exemplary implementation of one or more aspects of the invention, in which 65-byte frames are used with a single sync byte at the beginning of the frame (N=64, M=1) for encapsulating data from packets that may be of any length (e.g., less than, equal to, or greater than 63 bytes). An exemplary protocol 100 is illustrated in FIG. 1 in accordance with the invention, in which eight framing or encapsulation rules R1-R8 are provided in corresponding table rows, with the first 6 rules R1-R6 being the same as in the conventional 64B/65B protocol 10 of FIG. 3. By including the rules R1-R6, the exemplary protocol 100 provides a modified 64B/65B implementation that is completely backward compatible with the conventional protocol 10, for example, allowing support for Ethernet packets or any other packets of 63 or more bytes.

In addition, the exemplary protocol 100 of FIG. 1 also provides for encapsulation of shorter packets (e.g., less than 63 bytes in length) alone or in combination with support for longer packets of 63 or more bytes. The protocol 100 and other protocols of the invention thus facilitate universal framing for a variety of communication types and services, for example, that can advantageously be employed in DSL or other communication systems to support a variety of different services, including but not limited to Ethernet, internet browsing, voice over IP, digital video, etc. As illustrated in FIG. 1, in addition to the above-described rules R1-R6, the protocol 100 supports framing for short packets (e.g., less than 63 bytes in this example), whereby the packet size is essentially decoupled from (e.g., independent of) the number of byte fields N in the frame data field.

Rule R7 is directed to the situation in which a pending packet ends and one or more short packets are started and ended within a frame. To finish transferring the remainder of the pending packet, a control byte $C_k$ is provided after an $F0_H$ sync byte, where k indicates the number of remaining bytes for the ending packet, similar to the case of rule R3 described above. The remaining k data bytes from this pending packet $D_0$-$D_{k-1}$ are then provided in the subsequent byte fields at positions $P_1$-$P_k$ in the frame data field following the control byte $C_k$, where $C_k$ indicates the location of the end of the data from the pending packet.

In accordance with the invention, another control byte $C_i$ is provided in position $P_{k+1}$ in this example after the final data byte $D_{k-1}$ of the previous packet, which indicates the end of the next (e.g., short) packet to be inserted in the frame data field. In general, the control byte $C_i$ can be inserted at any pre-defined location in the frame, such as between the end of the packet that is finishing and the start of the next packet. In this regard, the illustrated implementation provides for locating the control byte $C_i$ an integer number X bytes after the end of the previous packet, where X is a pre-defined number. For example, where X=0, the control byte $C_i$ is provided immediately after the previous packet. In another possible implementation, the control byte $C_i$ can alternatively be provided an integer number X bytes before the start of the next packet. In this case, with X=0, the control byte $C_i$ is located immediately before S, or the control byte $C_i$ can itself indicate the start of the next packet (e.g., with no separate start byte S), wherein all such alternative implementations are contemplated as falling within the scope of the invention and the appended claims.

As with the first control byte $C_k$, the control byte $C_i$ for the short packet is computed as $i+10_H$ (e.g., k+00010000 binary) in the illustrated implementation, where the most significant bit (MSB) of $C_i$ is set such that the resulting value of $C_i$ has even parity, whereby the control byte $C_i$ indicates the position of the final data byte $D_{q-1}$ of the q-byte short packet in the frame data field. Other implementations are possible within the scope of the invention, wherein the control byte $C_i$ is computed in any manner that allows unambiguous identification of the end of the packet. Zero, one, or more Z-bytes ($00_H$) may be inserted before or may follow after the $C_i$ control byte, depending on the value of X used (in the illustrated example X=0), and a start byte S ($50_H$) is provided to indicate the beginning of the short packet data, beginning in the next byte field (e.g., at position $P_n$ in FIG. 1). The short packet data $D_0$-$D_{q-1}$ is then provided in the byte fields following the start byte S, where the last such data byte $D_{q-1}$ is located in the position indicated by the control byte $C_i$, with the remaining byte fields of the frame being filled with Z-bytes ($00_H$). In this implementation, i is the number of bytes from the beginning of the frame data field to the last byte of the data for the packet following the corresponding $C_i$ control byte.

It is noted that further short packets may be provided in the frame per rule R7, with a corresponding control byte $C_i$, optionally followed by one or more Z-bytes, with an S byte preceding the corresponding data bytes thereof, where the frame can either end with a data byte or a Z-byte. Also, a partial packet, whether short or long, could be started in the frame after the completed short packet within the scope of rule R7 (e.g., similar to the above rule R3), wherein one or more Z-bytes ($00_H$) may be provided following the last data byte $D_{q-1}$ of the completed short packet, and a start byte S is provided before the initial data bytes of the next packet, which itself will end or be completed in a subsequent frame or frames.

Rule R8 provides for inserting one or more short packets in a frame that does not include the end of a previous packet. In this case, one or more short packets are provided in the frame data field using corresponding control bytes $C_i$ to indicate the packet ends and start bytes S to indicate the beginning of the data bytes of the packets. Alternatively or in combination, a partial packet can be provided at the end of the frame, with a corresponding start byte S preceding the partial data, without a corresponding control byte $C_i$ (e.g., which may be thought of as providing a control byte $C_i$ having a value that is equal to that of an idle byte Z). Moreover, as illustrated in FIG. 1, zero, one or more Z-bytes may optionally be situated between corresponding control and start bytes $C_i$ and S, respectively, (e.g., the start byte S may be immediately preceded by the control byte $C_i$). As another variation under rule R8 in the exemplary 64B/65B protocol 100, a short packet may begin after an idle period, in which case, one or more Z-bytes may follow the sync byte, after which a control byte $C_i$ will be provided to indicate the end position of the last data byte of the corresponding first packet. As described above, a start byte S will precede the first byte of the data for packets beginning in the frame, where one or more optional Z-bytes may, but need not, be provided between the control byte $C_i$ and the start byte S.

Thus, the provision of the rules R7 and R8 in the exemplary protocol 100 allows short packets to be encapsulated (e.g., packets with fewer than 63 data bytes), where the rules R1-R6 provide support for Ethernet or other larger packets having more than 63 data bytes, whereby the packet length is no longer dependent upon the number of byte fields in the frame data field. Although illustrated and described above for the case of a 65-byte frame with a single sync byte, other implementations of the invention are possible using larger or smaller frames for N/(N+M)-byte applications, where the frames consist of N data byte fields and M delineation (e.g., sync) bytes, where support is provided for encapsulation of short packets having less than 63 bytes as well as larger packets, wherein all such alternate fixed length frame implementations that support multiple packets in a single frame and/or packets shorter than the frame data field size are contemplated as falling within the scope of the invention and the appended claims.

In addition to the above variations, many other alternative implementations are possible within the scope of the invention. For instance, in the illustrated protocol 100, i is the number of bytes from the beginning of the frame to the last byte of the data for the packet following the corresponding $C_i$ control byte. In one possible alternate implementation, the value $C_i$ may instead indicate the end of the packet data where i is the length of the packet (counted after the S-byte) or the length of the packet plus the optional inter-packet gap (e.g., Z-bytes) plus 1 byte. However, it is noted that in the illustrated implementation of the protocol 100, the computation of the $C_i$ values uses the same algorithm used for the computation of $C_k$ control bytes of Rules R2 and R3, whereby the illustrated example may be easier to implement.

In addition, it is noted that in the exemplary protocol 100, the $C_i$ control bytes may be provided at any location between the end of the previous packet and the start byte S of the next packet, wherein the particular location may be pre-defined in certain implementations. One possible alternative implementation is to place the control byte $C_i$ immediately prior to the corresponding start byte S for a short packet, wherein the control byte $C_i$ is set to Z ($00_H$) if the packet ends beyond the frame boundaries. This case is very convenient for "pipeline" implementation, when a control byte $C_i$ is inserted just when we get a packet to send (in the previous case we need first to buffer the whole packet). Yet another alternative implementation could be to place a control byte $C_i$ instead of a start byte S if the end of the packet is inside the frame, while using a $C_i$ as computed above. One or more Z-bytes may be set between the $C_i$ and the end of the previous packet. This case may be convenient for implementation, but may slightly increase the probability of false detection of the start of the packet compared with the illustrated implementation of the protocol 100 that uses a fixed start byte value of $50_H$.

Referring also to FIGS. 2A-2G, an exemplary packet framing or encapsulation method 200 is hereinafter illustrated and described, in accordance with the invention. While the method 200 is illustrated and described below as a series of acts or events, it will be appreciated that the present invention is not limited by the illustrated ordering of such acts or events. For example, some acts may occur in different orders and/or concurrently with other acts or events apart from those illustrated and/or described herein, in accordance with the invention. In addition, not all illustrated steps may be required to implement a methodology in accordance with the present invention. Furthermore, the methods according to the present invention may be implemented in association with any type or form of communication system, including but not limited to DSL systems. For instance, the method 200 is illustrated and described hereinafter for a general case where the frames have a frame data field consisting of an integer number N byte fields, with a single sync byte (e.g., a N/(N+1)-byte protocol), although the method 200 and other methods of the invention are applicable using any N/(N+M)-byte protocol, where N and M are positive integers, with N being greater than M, and where M is typically a small number, such as 1 or 2. In this regard, although the exemplary protocol 100 of FIG. 1 is referenced at various points in the following discussion of the general method 200 for illustrative purposes, the method 200 and other methods of the invention are not limited to the exemplary protocol 100 or to 64B/65B implementations.

Beginning at 202 in FIG. 2A, a determination is made at 204 as to the type of the next frame to be constructed. Depending upon the next packet, if any, to be encapsulated or framed, determinations or decisions are thereafter made at 206-212 as to which of the protocol rules R1-R8 (FIG. 1) will be employed in constructing the next frame. At 206, a determination is made as to whether the next frame is to be an idle frame. For instance, if the next packet is not yet available, the frame will be an idle frame (YES at 206), and the method 200 proceeds to FIG. 2B as discussed below. If the next frame is not an idle frame (NO at 206), a determination is made at 208 as to whether the next packet will be all data. For example, more than N data bytes may remain from a previously started (e.g., pending) packet, in which case (YES at 208), the method 200 proceeds to FIG. 2C as described below. Otherwise (NO at 208), a determination is made at 210 as to whether the next frame will include the end of a pending packet. If so (YES at 210), the method 200 proceeds to FIG. 2D as described further below, and if not (NO at 210), the next frame is determined at 212 to include the start of the next packet, and the method 200 proceeds to FIG. 2F.

Referring initially to FIGS. 2A and 2B, if it is determined that the next frame is to be an idle frame (YES at 206 in FIG. 2A), the method 200 proceeds to 220 in FIG. 2B, where a determination is made as to whether the communication system is synchronized or not. If the receive state machine is out of sync (NO at 220), the frame is constructed at 222-226 (e.g., rule R6 of FIG. 1). In this case, a sync byte ($F0_H$) is provided at 222 at the beginning of the frame, a Y byte ($D1_H$) is provided at 224 in the first byte field at location $P_0$ in the frame data field, and the remaining byte fields ($P_1$-$P_{N-1}$) are provided with Z-bytes ($00_H$) at 226, after which the method 200 returns to 204 in FIG. 2A to create the next frame. In the case where the system is in sync (YES at 220 in FIG. 2B), the frame is instead created at 230 and 232 (e.g., rule R4 of FIG. 1), where the sync byte ($F0_H$) is provided at 230, and all the data byte fields are provided with Z-bytes at 232 ($00_H$), before the method 200 returns to 204 in FIG. 1A.

Referring now to FIGS. 2A and 2C, in the case where an "all data" frame is to be constructed (YES at 208 in FIG. 2A), the method 200 proceeds (e.g., according to rule R1 of FIG. 1) at 240 and 242 in FIG. 2C, where a sync byte having a value of $0F_H$ is provided at 240, after which the entire frame data field is filled with packet data bytes at 242, before the method 200 returns to 204 in FIG. 2A to begin the next frame.

Figure 2D:
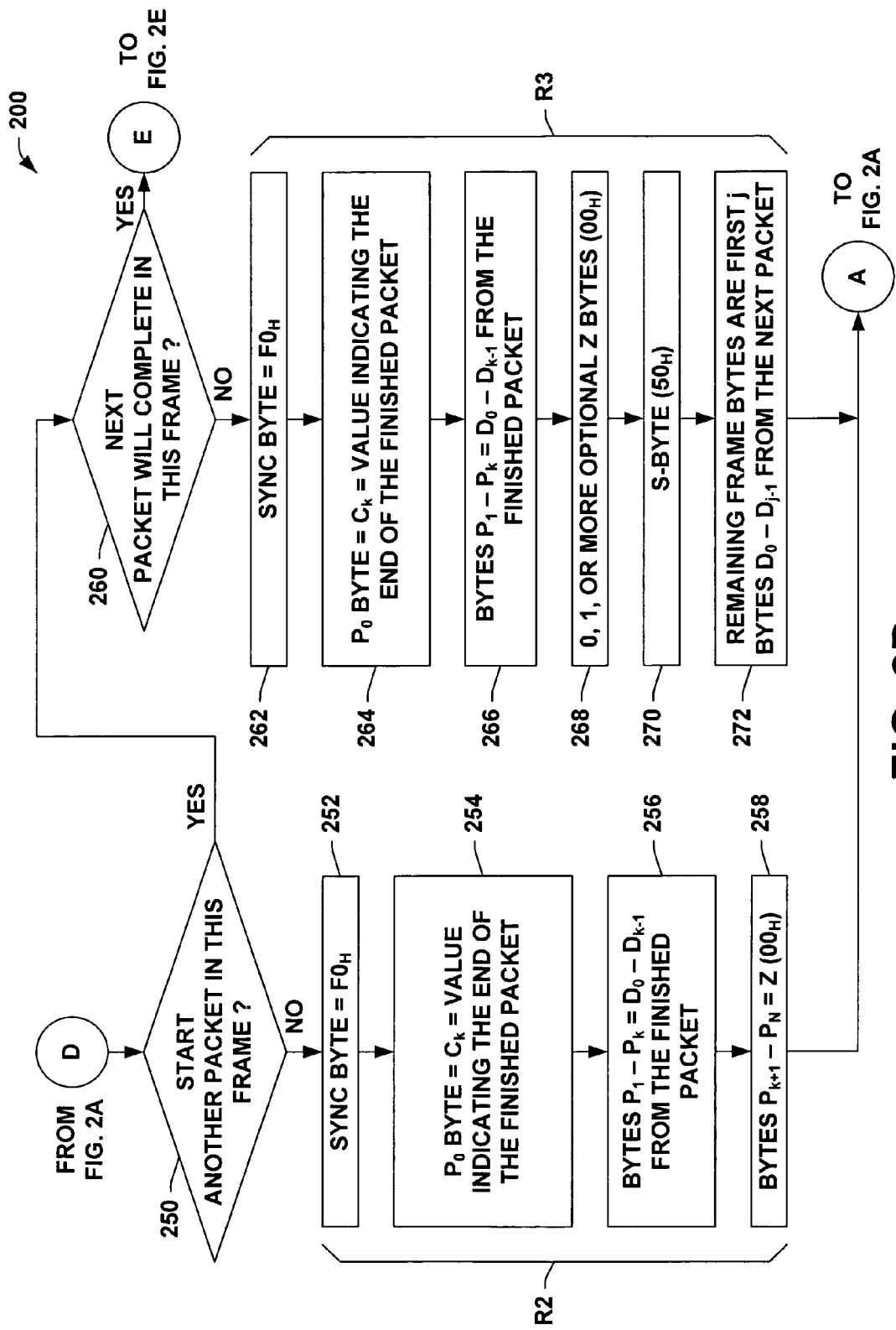
Figure 2E:
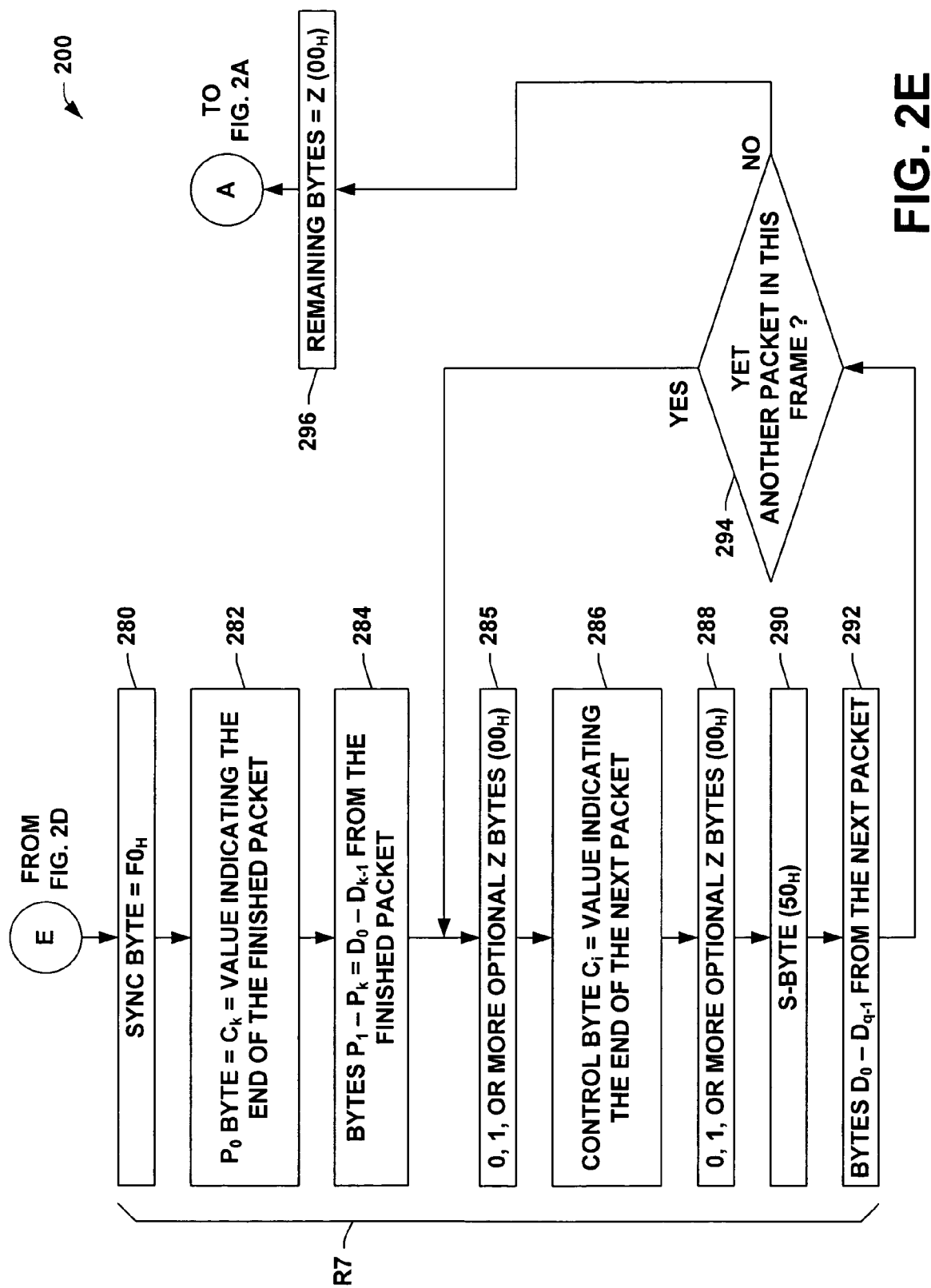

Referring now to FIGS. 2A, 2D, and 2E, in the case where a packet will end in the current frame (YES at 210 in FIG. 2A), the method 200 proceeds according to one of the rules R2, R3, or R7 as illustrated in FIGS. 2D and 2E. At 250 in FIG. 2D, a determination is made as to whether the next packet will begin in the frame. If not (NO at 250), the current frame is constructed at 252-258 (e.g., according to rule R2 of FIG. 1). At 252, a sync byte having a value of $F0_H$ is provided at 252, and a control byte $C_k$ is provided at 254 in the first byte location (P0) of the frame data field, where the control byte $C_k$ is indicative of the end of the subsequent corresponding data bytes. In the exemplary protocol 100 of FIG. 1 above, the control byte $C_k$ is computed as $k+10_H$ (e.g., k+00010000 binary), where the most significant bit (MSB) of $C_k$ is set such that the resulting value of $C_k$ has even parity, although other control bytes can be used which somehow indicate the end of the packet data bytes within the frame. Thereafter at 256, the remaining data bytes $D_0$-$D_{k-1}$ from the current packet are provided in the corresponding byte fields $P_1$-$P_k$ of the frame data field, with any remaining byte fields being filled with Z-bytes ($00_H$) at 258 before the method 200 returns to 204 in FIG. 2A to create another frame.

Where another packet will begin in the current frame (YES at 250 in FIG. 2D), a determination is made at 260 as to whether the next packet will complete in the current frame (e.g., whether the next packet is a short packet having less than N−1 bytes of data that will fit in the remaining space of the current frame). If not (NO at 260), the current frame is created at 262-272 of FIG. 2D, including the remaining portion of the current packet and the beginning portion of the next packet (e.g., rule R3 of FIG. 1). In this case, a sync byte having a value of $F0_H$ is provided at 262, and a control byte $C_k$ is provided at 264 in the first byte location (P0) of the frame data field, where the value of the control byte $C_k$ may be computed at 264 using the above described formula or other suitable technique to indicate the end of the subsequent corresponding data bytes from the pending packet. The remaining data bytes $D_0$-$D_{k-1}$ from the current packet are provided at 266 in the corresponding byte fields $P_1$-$P_k$. One or more optional Z-bytes ($00_H$) may (but need not) be provided after the last data byte $D_{k-1}$ at 268, and a start byte S ($50_H$) is provided at 270 to indicate the beginning of the data from the next packet. At 272, the initial data bytes from this next packet are provided in the remaining byte fields to complete the current frame, before the method 200 returns to 204 in FIG. 2A to begin the next frame.

In the case where the next packet is short (e.g., less than N−1 bytes) and will complete in the current frame (YES at 260 in FIG. 2D), the method 200 proceeds to FIG. 2E, where the current frame is created at 280-296 (e.g., rule R7 of FIG. 1) in accordance with the present invention. A sync byte is provided at 280 having a value of $F0_H$, and a control byte $C_k$ is provided at 282 to indicate the end of the remaining data from the pending packet (e.g., $C_k$ computed as described above or using other suitable techniques). At 284, the remaining data bytes $D_0$-$D_{k-1}$ from the current packet are provided, and zero, one or more optional Z-bytes may be provided following the last data byte $D_{k-1}$ at 285.

At 286, a control byte $C_i$ is provided to indicate the end of the next packet in the current frame (e.g., where $C_i$ may be computed as described above or other suitable technique), wherein the control byte $C_i$ may be followed by zero, one or more optional Z-bytes ($00_H$) at 288. Thereafter, a start byte S is provided at 290 ($50_H$) to indicate the beginning of the data bytes $D_1$-$D_{q-1}$ for the next frame, which are then provided in the frame data field at 292. A determination is made at 294, as to whether yet another short packet is to be provided in the current frame. If so (YES at 294), the method proceeds to 285-292 as described above, to provide another short packet in the frame data field, including a control byte $C_i$ indicating the end of the packet and a start byte S indicating the beginning of the packet data, where zero, one or more optional Z-bytes ($00_H$) may be provided prior to the control byte $C_i$. Otherwise (NO at 294), the remaining byte fields are filled with Z-bytes ($00_H$) at 296, and the method 200 returns to 204 in FIG. 2A for creating the next frame. As discussed above, a partial packet, whether short or long, could be started in the frame after the completed short packet within the scope of rule R7 (e.g., similar to the above rule R3), wherein one or more Z-bytes ($00_H$) can be provided following the last data byte $D_{q-1}$ of the completed short packet, and a start byte S is provided before the initial data bytes of the next packet, which itself will end in a subsequent frame.

It is noted that the method 200 is illustrated in FIGS. 2A-2G in the form of a logic diagram to illustrate the various aspects of the invention in the context of the rules R1-R8 of FIG. 1. However, it is appreciated that state machines, software, or other logic systems may be constructed to implement the various rules R1-R8 according to the invention, wherein the decisions on which rule to employ for a given frame need not be made prior to constructing the frame, where one or more such decisions may be made during frame construction after a potion of the frame has been structured. For example, if a packet is ending in a given frame, as in FIGS. 2D and 2E, the portion of the frame involving the finished packet may be constructed through provision of a sync byte (252, 262, or 280), a corresponding control byte $C_K$ (254, 264, 282), and the corresponding data bytes (254, 266, 284), with the determinations as to whether another packet is to begin in the current frame (250 in FIG. 2D) and whether such a packet will complete in the current frame (260 in FIG. 2D) being made as the information needed to make such determinations becomes available. In this regard, the implementation of the various steps illustrated in FIGS. 2A-2G may be such that pipelining or other logic circuit minimizations are done to minimize redundancy or other optimizations are undertaken whereby the acts required in more than one of the exemplary rules R1-R8 may be undertaken in a single portion of the state machine or logic circuit, wherein all such implementations are contemplated as falling within the scope of the invention and the appended claims.

Figure 2F:
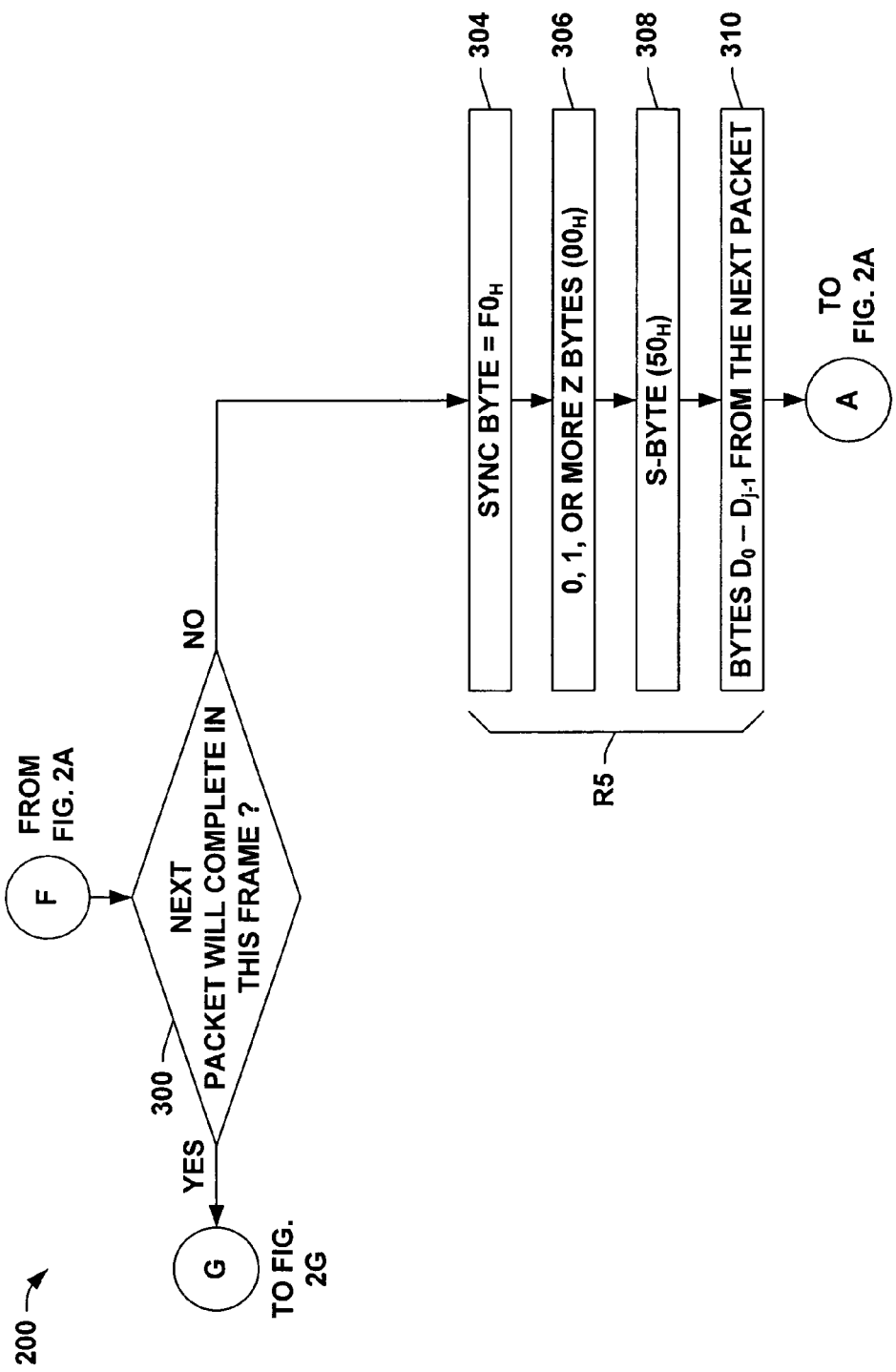
Figure 2G:
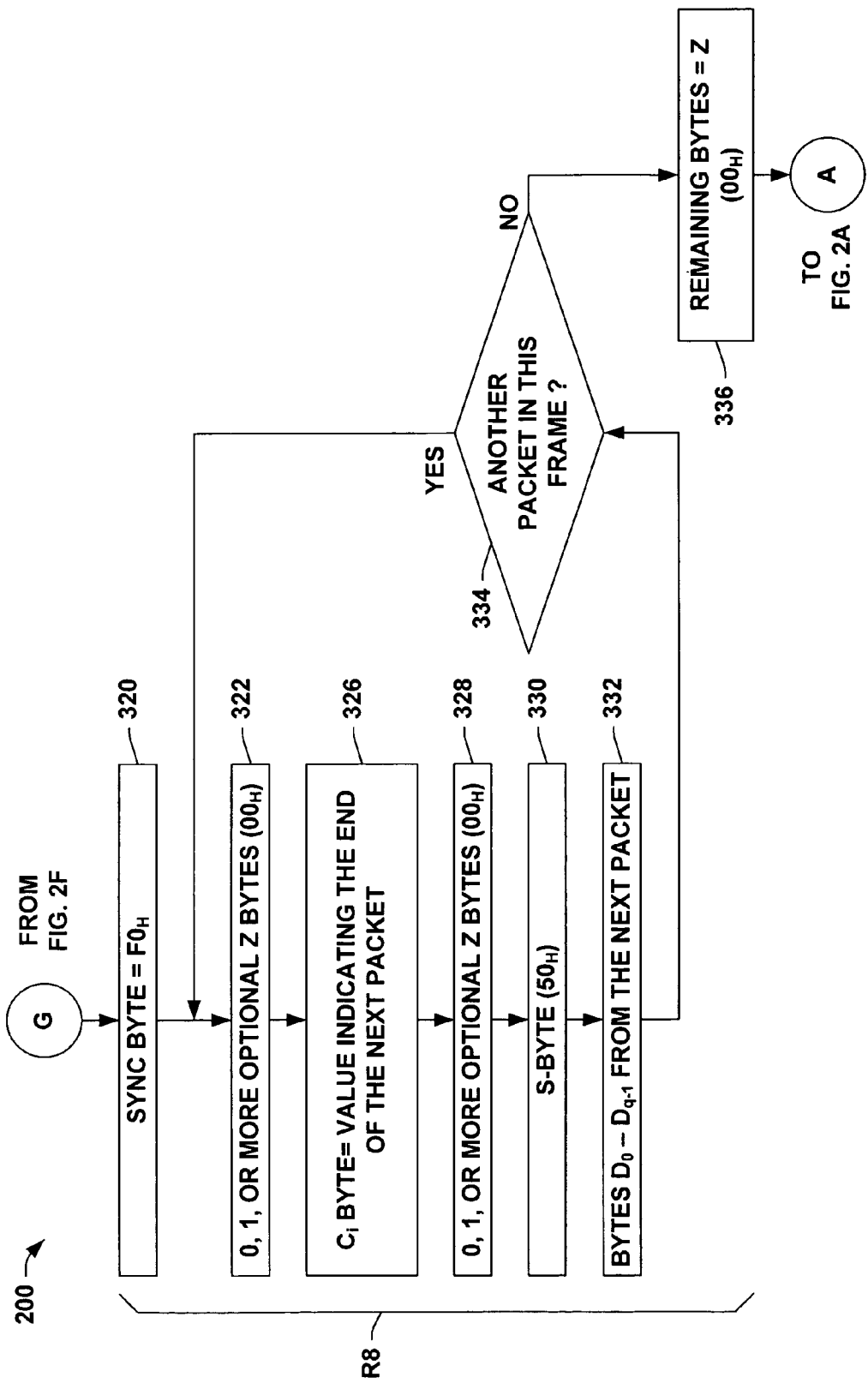

Referring now to FIGS. 2A, 2F, and 2G, in the case where the next frame is to include the beginning or start of a packet (212 in FIG. 2A), the method 200 proceeds to 300 in FIG. 2F. A determination is made at 300 as to whether the next packet will complete in the current frame (e.g., whether the next packet is a short packet of less than N−1 bytes). If not (NO at 300, indicating the next packet is greater than or equal to N−1 bytes in length), the frame is created at 304-310 in FIG. 2F (e.g., rule R5). In this case, a sync byte ($F0_H$) is provided at 304, followed by one or more Z-bytes at 306. A start byte S ($50_H$) is then provided at 308 to indicate the starting position for the first data bytes in the frame data field, followed by the data bytes $D_0$-$D_{j-1}$ at 310, and the method 200 returns to create the next frame at 204 in FIG. 2A.

In the case where the next packet will complete in the current frame (YES at 300 in FIG. 2F), the method 200 proceeds to FIG. 2G, where the frame is constructed at 320-336 (rule R8 in the exemplary protocol 100 of FIG. 1). A sync byte ($F0_H$) is provided at 320 to delineate the start of the current frame, zero, one, or more Z-bytes ($00_H$) are provided at 322 after the sync byte, and a control byte $C_i$ is provided at 326 to indicate the end of the packet data bytes in the frame. At 328, zero, one or more Z-bytes ($00_H$) are provided after the control byte $C_i$, and a start byte S ($50_H$) is provided at 330. Thereafter, the corresponding packet data bytes $D_1$-$D_{q-1}$ are provided at 332 for the current packet. A determination is then made at 334 as to whether another (short) packet is to be provided in the frame. If so (YES at 334), the method proceeds to 322-332 as described above, where one or more optional Z-bytes ($00_H$) may be provided at 322 prior to providing the next control byte $C_i$ at 326. Otherwise (NO at 334), the remaining byte fields are filled with Z-bytes ($00_H$) at 336, and the method 200 returns to 204 in FIG. 2A for creating the next frame.

Although the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A method for efficiently transmitting a frame in a communication system, the method comprising:
providing M sync bytes indicative of a frame boundary, wherein M is a positive integer;
providing a frame data field consisting of an integer number N byte fields, the M sync bytes and the N-byte frame data field forming a frame;
providing an entire short data packet in the frame data field, the short data packet having a length less than N−1 data bytes;
providing at least one data byte of a second data packet in the frame data field; and
providing first and second control bytes in the frame data field, the first control byte being indicative of an end of the data bytes of the short data packet in the frame data field and being prior to the start of the data bytes of the short data packet in the frame data field, and the second control byte being indicative of an end of the data bytes of the second data packet in a subsequent frame and being prior to the start of the data bytes of the second data packet in the frame data field;
transmitting the frame from a transmitter to a receiver over a communication channel of the communication system.

2. The method of claim 1, further comprising providing first and second start bytes in the data field, the first start byte being indicative of a start of the data bytes of the short data packet in the data field, and the second start byte being indicative of a start of the data bytes of the second packet in the data field.

3. The method of claim 1, further comprising providing all or some data bytes of a second short data packet in the data field, the second short data packet having a length less than N−1 data bytes.

4. The method of claim 1, further comprising providing a start byte in the data field, the start byte being indicative of a start of the data bytes of the short data packet in the data field.

5. The method of claim 1, wherein M=1.

6. The method of claim 5, wherein the sync byte is indicative of a start of the frame.

7. The method of claim 5, wherein N=64.

8. The method of claim 1, wherein N=64.

9. A method of efficiently transmitting (N+1) byte frames in a communication system, the method comprising:
providing a single sync byte;
providing an N byte frame data field following the sync byte to create an (N+1) byte frame, N being a positive integer greater than 1, wherein the sync byte is indicative of a start of the frame;
providing all data bytes of a short data packet in the data field, the short data packet having at least one but less than N−1 data bytes;
providing at least one data byte of a second data packet in the frame data field; and
providing first and second control bytes in the frame data field, the first control byte being indicative of an end of the data bytes of the short data packet in the frame data field and being prior to the start of the data bytes of the short data packet in the frame data field, and the second control byte being indicative of an end of the at least one data byte of the second data packet in a subsequent frame and being prior to the start of the data bytes of the second data packet in the frame data field;
transmitting the frame from a transmitter to a receiver over a communication channel of the communication system.

10. The method of claim 9, further comprising selectively providing a start byte in the data field if the short data packet starts in the frame, the start byte being indicative of a start of the data bytes of the short data packet in the data field.

11. An executable program stored on a non-transitory computer readable medium for encapsulating data packets using (N+1)-byte, wherein the program instructs a processor to perform the following steps:
forming an (N+1) byte frame consisting of a single sync byte and an N byte frame data field following the sync byte, N being a positive integer;
providing all data bytes from a first short data packet in the frame data field, wherein the first short data packet has less than N−1 data bytes;

providing at least one data byte of a second data packet in the frame data field;

and providing first and second control bytes in the frame data field, the first control byte being indicative of an end of the data bytes of the short data packet in the frame data field and being prior to the start of the data bytes of the short data packet in the frame data field, and the second control byte being indicative of an end of the at least one data byte of the second data packet in a subsequent frame and being prior to the start of the data bytes of the second data packet in the frame data field.

12. The executable program stored on a non-transitory computer readable medium of claim 11, the executable program further comprising selectively providing a first start byte in the data field, the first start byte being indicative of a start of the data bytes of the first short data packet in the data field.

13. The executable program stored on a non-transitory computer readable medium of claim 12, the executable program further comprising selectively providing a second start byte in the data field if the second data packet starts in the frame, the second start byte being indicative of a start of the data bytes of the second data packet in the data field.

14. The computer readable medium of claim 11, the method further comprising selectively providing a start byte in the data field, the start byte being indicative of a start of the data bytes of the first short data packet in the data field.

15. A method for efficiently transmitting data packets using (N+M) byte frames in a communication system, the method comprising:

providing transmit frames individually having a fixed integer number M sync bytes indicating a frame boundary and a data field having a fixed integer number N data field bytes;

providing data bytes from data packets in the transmit frames, wherein the data packet lengths are independent of the number N;

wherein entire short data packets are selectively provided in a single frame; and providing two or more control bytes in the individual data fields, the control bytes respectively indicating an end of data bytes for a given data packet that ends in the frame and in a subsequent frame and at least one of the control bytes being prior to the start of the data bytes of the given packet in the frame data field;

transmitting the transmit frames from a transmitter to a receiver over a communication channel of the communication system.

16. The method of claim 15, further comprising providing one or more start bytes in the individual data fields, the start bytes individually indicating a start of data bytes for a given data packet that starts in the frame.

* * * * *